(12) United States Patent
Honda et al.

(10) Patent No.: US 11,119,479 B2
(45) Date of Patent: Sep. 14, 2021

(54) VEHICLE CONTROL APPARATUS

(71) Applicant: HONDA MOTOR CO., LTD., Tokyo (JP)

(72) Inventors: Shigehiro Honda, Wako (JP); Yoshihiro Oniwa, Wako (JP); Atsushi Ishioka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 226 days.

(21) Appl. No.: 16/411,528

(22) Filed: May 14, 2019

(65) Prior Publication Data

US 2019/0265700 A1 Aug. 29, 2019

Related U.S. Application Data

(63) Continuation of application No. PCT/JP2016/086225, filed on Dec. 6, 2016.

(51) Int. Cl.
*G05D 1/00* (2006.01)
*B60W 50/14* (2020.01)
(Continued)

(52) U.S. Cl.
CPC .......... *G05D 1/0061* (2013.01); *B60R 21/00* (2013.01); *B60W 30/14* (2013.01); *B60W 50/14* (2013.01);
(Continued)

(58) Field of Classification Search
CPC ..... G05D 1/0061; B60R 21/00; B60W 30/14; B60W 50/14; B60W 2050/143; G08G 1/00; G08G 1/09; G08G 1/16
(Continued)

(56) References Cited

U.S. PATENT DOCUMENTS 10,071,745 B2   9/2018 Sato
10,315,664 B2   6/2019 Sato
(Continued)

FOREIGN PATENT DOCUMENTS

CN   200950220 Y   *  9/2007
CN   105984485 A   * 10/2016   ............. B60K 35/00
(Continued)

OTHER PUBLICATIONS

Hossein et al., "Embedded Multi-Sensors Objects Detection and Tracking for Urban Autonomous Driving," 2011, Publisher: IEEE.*
(Continued)

*Primary Examiner* — Tuan C To
(74) *Attorney, Agent, or Firm* — Thomas | Horstemeyer, LLP

(57) ABSTRACT

A vehicle control apparatus includes a notification unit configured to notify a driver of a switching request from automated driving to manual driving, and a setting unit configured to set a notification timing of the notification unit. In a case in which a course change of a vehicle is needed up to a predetermined point during the automated driving, the setting unit sets a timing that comes earliest from a plurality of candidates of the notification timing. The plurality of candidates includes a first candidate based on a condition necessary for completing the course change by the manual driving up to the predetermined point, and a second candidate based on a condition necessary for setting the vehicle in a predetermined standby state by the automated driving up to the predetermined point.

7 Claims, 8 Drawing Sheets

(51) Int. Cl.
    *G08G 1/00*     (2006.01)
    *G08G 1/09*     (2006.01)
    *B60R 21/00*     (2006.01)
    *B60W 30/14*     (2006.01)
    *G08G 1/16*     (2006.01)

(52) U.S. Cl.
    CPC ............... *G08G 1/00* (2013.01); *G08G 1/09* (2013.01); *G08G 1/16* (2013.01); *B60W 2050/143* (2013.01)

(58) Field of Classification Search
    USPC .......................................................... 701/23
    See application file for complete search history.

(56) References Cited

U.S. PATENT DOCUMENTS

| | | | |
|---|---|---|---|
| 2016/0041553 A1* | 2/2016 | Sato | B60W 30/143 701/23 |
| 2016/0185345 A1* | 6/2016 | Sasabuchi | B60W 30/08 701/301 |
| 2016/0259334 A1* | 9/2016 | Hashimoto | G05D 1/0061 |
| 2017/0197635 A1 | 7/2017 | Sato | |
| 2017/0217394 A1* | 8/2017 | Shima | B60R 21/00 |
| 2018/0015828 A1* | 1/2018 | Mcnew | B60Q 9/00 |
| 2018/0093676 A1* | 4/2018 | Emura | G01C 21/3605 |
| 2018/0281788 A1* | 10/2018 | Uchida | B60W 50/00 |

FOREIGN PATENT DOCUMENTS

| | | | | |
|---|---|---|---|---|
| DE | 102014222195 A1 * | 5/2016 | | B60K 35/00 |
| EP | 2982565 A2 * | 2/2016 | | G05D 1/0088 |
| EP | 3045996 A1 * | 7/2016 | | G05D 1/0061 |
| JP | H09-161196 A | 6/1997 | | |
| JP | 2000-020898 A | 1/2000 | | |
| JP | 2008-290680 A | 12/2008 | | |
| JP | 2016-034782 A | 3/2016 | | |
| JP | 2016-050901 A | 4/2016 | | |
| WO | 2016/035485 A1 | 3/2016 | | |
| WO | WO-2016109637 A1 * | 7/2016 | | G01C 21/3664 |
| WO | WO-2016121710 A1 * | 8/2016 | | B60W 30/182 |
| WO | 2018105037 A1 | 6/2018 | | |

OTHER PUBLICATIONS

Alois et al., "Selective Attention for Detection and Tracking of Road-Networks in Autonomous Driving," 2013, Publisher: IEEE.*
International Search Report for PCT/JP2016/086225 dated Mar. 14, 2017 (partially translated).
Chinese Office Action (with partial translation) for Chinese Patent Application No. 201680090510.X dated Feb. 2, 2021.

* cited by examiner

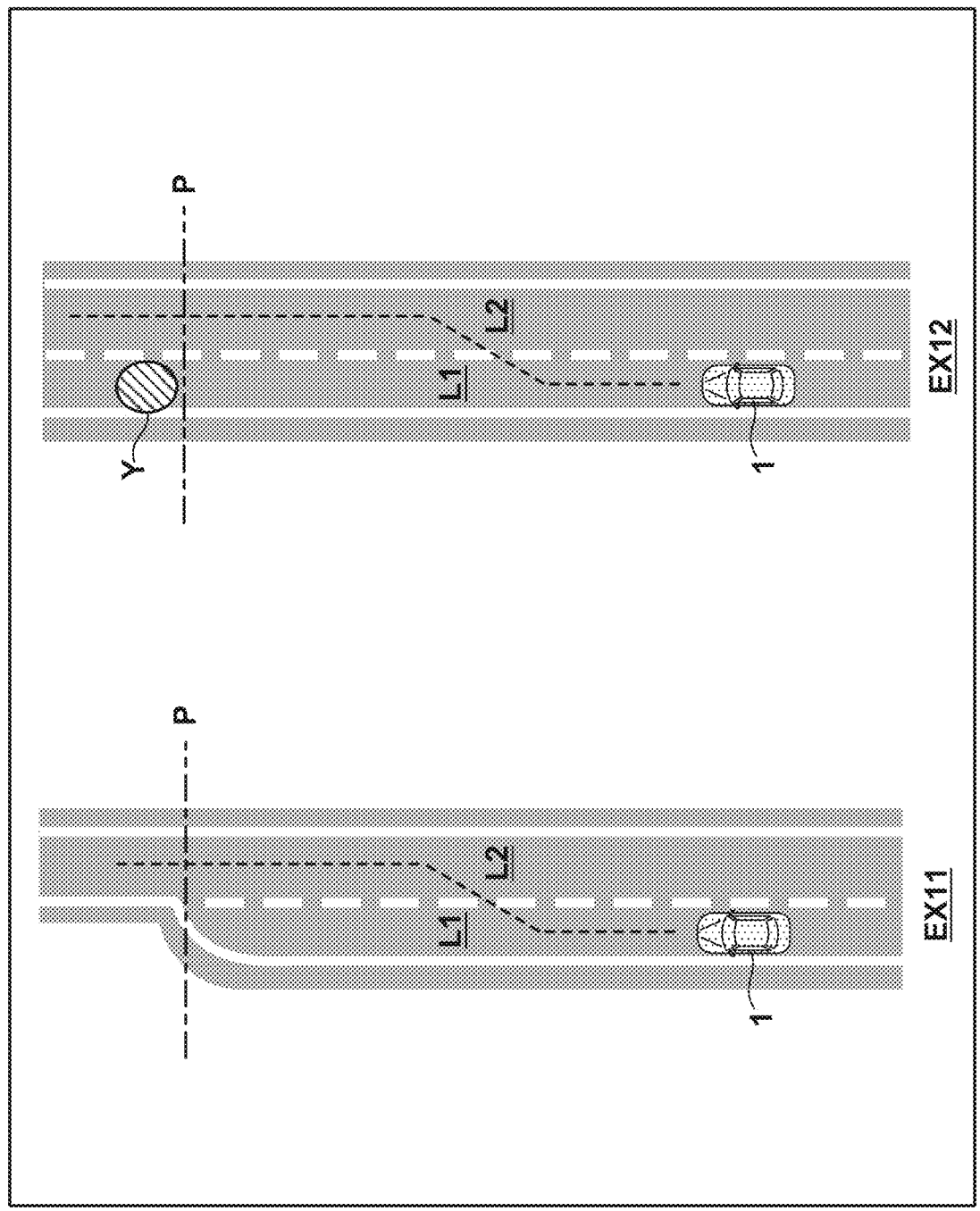

VEHICLE CONTROL APPARATUS

CROSS-REFERENCE TO RELATED APPLICATION(S)

This application is a continuation of International Patent Application No. PCT/JP2016/086225 filed on Dec. 6, 2016, the entire disclosures of which is incorporated herein by reference.

TECHNICAL FIELD

The present invention relates to a technique of controlling a vehicle.

BACKGROUND ART

Automated driving of a vehicle contributes to reduction of a burden on a driver. In some cases, however, it is difficult to travel by automated driving, or manual driving is more appropriate. Japanese Patent Laid-Open No. 2016-050901 discloses a technique of switching the driving state from automated driving to manual driving or from manual driving to automated driving. Japanese Patent Laid-Open No. 2016-050901 also discloses notifying the driver of a guidance to promote a takeover in a case in which it is necessary to switch the driving form from automated driving to manual driving.

Even if the notification of switching from automated driving to manual driving is made, the driver may be confused in coping with manual driving, or the driver may not notice the notification. A course change such as a lane change needs to be done while attaining harmony with peripheral vehicles. Hence, an opportunity of switching the driving state from automated driving to manual driving is considered to relatively easily occur, and it is demanded to improve the reliability and safety of the course change.

SUMMARY OF INVENTION

It is an object of the present invention to improve the reliability and safety of a course change.

According to the present invention, there is provided a vehicle control apparatus capable of switching a driving state to automated driving and manual driving, comprising: a notification unit configured to notify a driver of a switching request from the automated driving to the manual driving; and a setting unit configured to set a notification timing of the notification unit, wherein in a case in which a course change of a vehicle is needed up to a predetermined point during the automated driving, the setting unit sets a timing that comes earliest from a plurality of candidates of the notification timing, and the plurality of candidates includes: a first candidate based on a condition necessary for completing the course change by the manual driving up to the predetermined point, and a second candidate based on a condition necessary for setting the vehicle in a predetermined standby state by the automated driving up to the predetermined point.

BRIEF DESCRIPTION OF DRAWINGS

FIG. 8 is an explanatory view of another example of a course change.

DESCRIPTION OF EMBODIMENTS

First Embodiment

Figure 1:
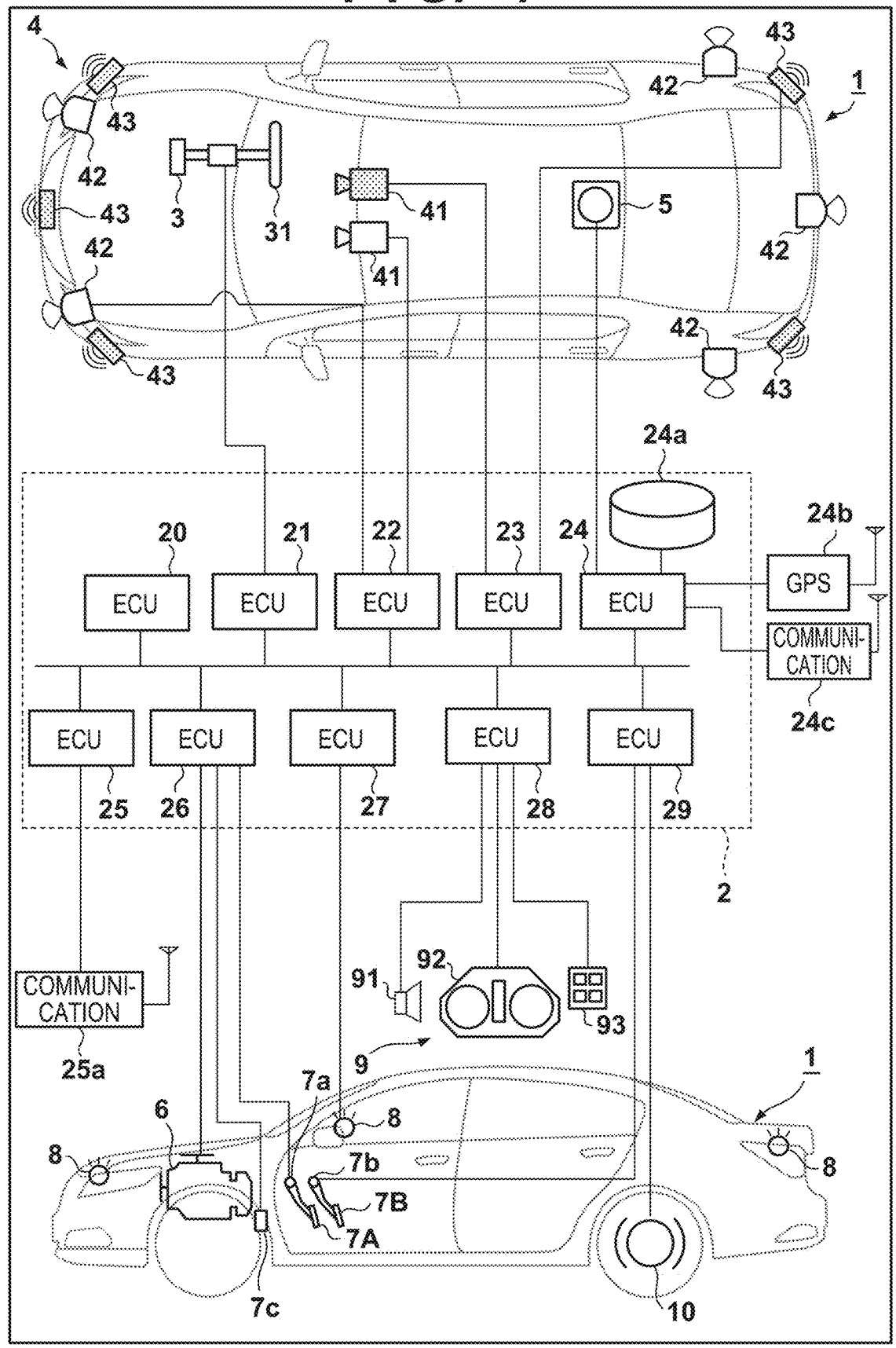
FIG. 1 is a block diagram of a vehicle control apparatus according to an embodiment.

FIG. 1 is a block diagram of a vehicle control apparatus according to an embodiment of the present invention, and a vehicle 1 is controlled. Referring to FIG. 1, an outline of the vehicle 1 is shown in a plan view and a side view. As an example, the vehicle 1 is a sedan-type four-wheeled vehicle.

The control apparatus shown in FIG. 1 includes a control unit 2. The control unit 2 includes a plurality of ECUs 20 to 29 communicably connected by an in-vehicle network. Each ECU includes a processor represented by a CPU, a storage device such as a semiconductor memory, an interface with an external device, and the like. The storage device stores programs to be executed by the processor, data to be used by the processor for processing, and the like. Each ECU may include a plurality of processors, storage devices, and interfaces.

The functions and the like provided by the ECUs 20 to 29 will be described below. Note that the number of ECUs and the provided functions can appropriately be designed, and they can be subdivided or integrated as compared to this embodiment.

The ECU 20 executes control associated with automated driving of the vehicle 1. In automated driving, at least one of steering and acceleration/deceleration of the vehicle 1 is automatically controlled. In a control example to be described later, both steering and acceleration/deceleration are automatically controlled.

The ECU 21 controls an electric power steering device 3. The electric power steering device 3 includes a mechanism that steers front wheels in accordance with a driving operation (steering operation) of the driver on a steering wheel 31. In addition, the electric power steering device 3 includes a motor that generates a driving force to assist the steering operation or automatically steer the front wheels, and a sensor that detects the steering angle. If the driving state of the vehicle 1 is automated driving, the ECU 21 automatically controls the electric power steering device 3 in correspondence with an instruction from the ECU 20 and controls the traveling direction of the vehicle 1.

The ECUs 22 and 23 perform control of detection units 41 to 43 that detect the peripheral status of the vehicle and information processing of detection results. The detection unit 41 is a camera (to be sometimes referred to as the camera 41 hereinafter) that captures the front side of the vehicle 1. In this embodiment, two cameras 41 are provided on the roof front of the vehicle 1. When images captured by the cameras 41 are analyzed, the contour of a target or a division line (a white line or the like) of a lane on a road can be extracted.

The detection unit 42 is a lidar (laser radar) (to be sometimes referred to as the lidar 42 hereinafter), and detects a target around the vehicle 1 or measures the distance to a target. In this embodiment, five lidars 42 are provided; one at each corner of the front portion of the vehicle 1, one at the center of the rear portion, and one on each side of the rear portion. The detection unit 43 is a millimeter wave radar (to be sometimes referred to as the radar 43 hereinafter), and detects a target around the vehicle 1 or measures the distance to a target. In this embodiment, five radars 43 are provided; one at the center of the front portion of the vehicle 1, one at each corner of the front portion, and one at each corner of the rear portion.

The ECU 22 performs control of one camera 41 and each lidar 42 and information processing of detection results. The ECU 23 performs control of the other camera 41 and each radar 43 and information processing of detection results. Since two sets of devices that detect the peripheral status of the vehicle are provided, the reliability of detection results can be improved. In addition, since detection units of different types such as cameras, lidars, and radars are provided, various aspects of the peripheral environment of the vehicle can be analyzed.

The ECU 24 performs control of a gyro sensor 5, a GPS sensor 24b, and a communication device 24c and information processing of detection results or communication results. The gyro sensor 5 detects a rotary motion of the vehicle 1. The course of the vehicle 1 can be determined based on the detection result of the gyro sensor 5, the wheel speed, or the like. The GPS sensor 24b detects the current position of the vehicle 1. The communication device 24c performs wireless communication with a server that provides map information or traffic information and acquires these pieces of information. The ECU 24 can access a map information database 24a formed in the storage device. The ECU 24 searches for a route from the current position to the destination.

The ECU 25 includes a communication device 25a for inter-vehicle communication. The communication device 25a performs wireless communication with another vehicle on the periphery and performs information exchange between the vehicles.

The ECU 26 controls a power plant 6. The power plant 6 is a mechanism that outputs a driving force to rotate the driving wheels of the vehicle 1 and includes, for example, an engine and a transmission. The ECU 26, for example, controls the output of the engine in correspondence with a driving operation (accelerator operation or acceleration operation) of the driver detected by an operation detection sensor 7a provided on an accelerator pedal 7A, or switches the gear ratio of the transmission based on information such as a vehicle speed detected by a vehicle speed sensor 7c. If the driving state of the vehicle 1 is automated driving, the ECU 26 automatically controls the power plant 6 in correspondence with an instruction from the ECU 20 and controls the acceleration/deceleration of the vehicle 1.

The ECU 27 controls lighting devices (headlights, taillights, and the like) including direction indicators 8. In the example shown in FIG. 1, the direction indicators 8 are provided in the front portion, door mirrors, and the rear portion of the vehicle 1.

The ECU 28 controls an input/output device 9. The input/output device 9 outputs information to the driver and accepts input of information from the driver. A voice output device 91 notifies the driver of the information by a voice. A display device 92 notifies the driver of information by displaying an image. The display device 92 is arranged on, for example, the surface of the driver's seat and constitutes an instrument panel or the like. Note that although a voice and display have been exemplified here, the driver may be notified of information using a vibration or light. Alternatively, the driver may be notified of information by a combination of some of the voice, display, vibration, and light. Furthermore, the combination or the notification form may be changed in accordance with the level (for example, the degree of urgency) of information of which the driver is to be notified.

An input device 93 is a switch group that is arranged at a position where the driver can perform an operation and used to issue an instruction to the vehicle 1, and may also include a voice input device.

The ECU 29 controls a brake device 10 and a parking brake (not shown). The brake device 10 is, for example, a disc brake device which is provided for each wheel of the vehicle 1 and decelerates or stops the vehicle 1 by applying a resistance to the rotation of the wheel. The ECU 29, for example, controls the operation of the brake device 10 in correspondence with a driving operation (brake operation) of the driver detected by an operation detection sensor 7b provided on a brake pedal 7B. If the driving state of the vehicle 1 is automated driving, the ECU 29 automatically controls the brake device 10 in correspondence with an instruction from the ECU 20 and controls deceleration and stop of the vehicle 1. The brake device 10 or the parking brake can also be operated to maintain the stop state of the vehicle 1. In addition, if the transmission of the power plant 6 includes a parking lock mechanism, it can be operated to maintain the stop state of the vehicle 1.

<Control Example>

Control executed by the ECU 20 in association with automated driving of the vehicle 1 will be described. When the driver instructs a destination and automated driving, the ECU 20 automatically controls traveling of the vehicle 1 to the destination in accordance with a guidance route searched by the ECU 24. In the automatic control, the ECU 20 acquires information concerning the peripheral status of the vehicle 1 from the ECUs 22 and 23, and makes instructions for the ECUs 21, 26, and 29 based on the acquired information, thereby controlling steering and acceleration/deceleration of the vehicle 1.

Figure 2:
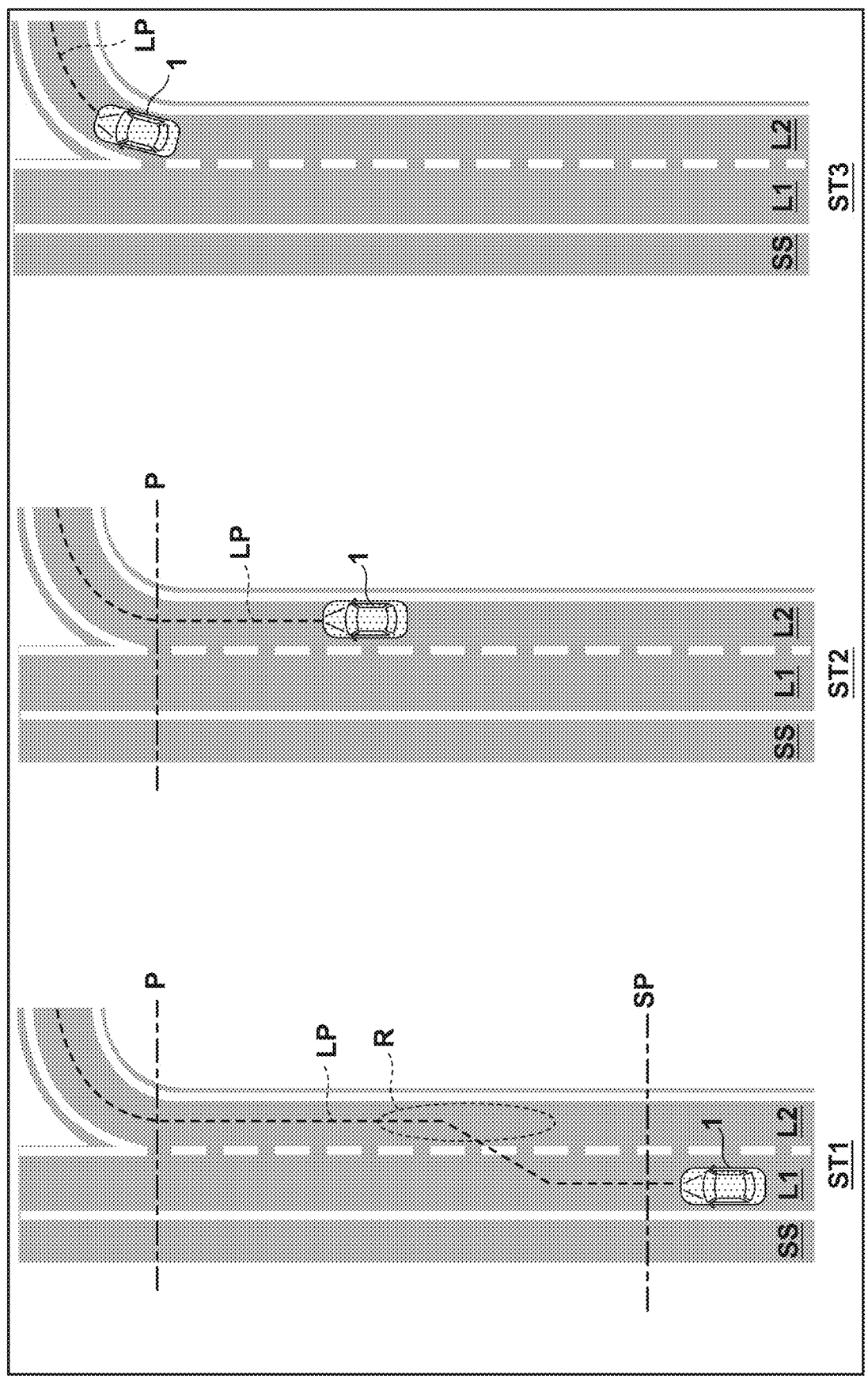
FIG. 2 is an explanatory view of a control example at the time of a course change.

FIG. 2 shows, schematically and step by step, an example of automated driving in a case in which a course is changed up to a branch point. A lane L1 is a lane during traveling of the vehicle 1 and a lane L2 is a lane adjacent to the lane L1. The lane L2 branches from the lane L1 on the downstream side. An evacuation space SS is, for example, a road side strip.

A state ST1 shows a state in which the vehicle 1 is going to change the course. In FIG. 2, a planned route LP represents a scheduled traveling track (action plan) of the vehicle 1 planned by the ECU 20 based on a guidance route searched by the ECU 24. As an example of the course change, a lane change from the lane L1 to the lane L2 is included.

The lane change is controlled to be performed between a completion point P that is a limit needed for the vehicle 1 to travel to the branch road (lane L2) at the branch point and a starting point SP at which the lane change operation is started. The starting point SP is set, for example, at a position a predetermined distance (for example, 2 km) before the completion point P. The distance from the completion point P, which defines the starting point SP, may be a fixed value or a variable value. In a case of a variable value, for example, when the lane L2 is crowded with other vehicles, the distance may be set relatively long. If there is not much traffic on the lane L2, the distance may be set relatively short. The congestion status of the lane L2 may be determined from the detection results of the detection units 41 to 43 or may be determined from traffic information acquired by the communication device 24c.

When the vehicle 1 passes the starting point SP, the ECU 20 determines whether the vehicle can enter the lane L2. More specifically, for example, the ECU 20 acquires the presence of a preceding vehicle and a following vehicle traveling on the lane L2 and vehicle speeds from the ECUs 22 and 23, and determines whether a space R that allows the vehicle 1 to enter the lane L2 without interference with these exists.

Upon determining that the vehicle 1 can enter, the ECU 20 continues automated driving, executes the lane change of the vehicle 1 while blinking the direction indicator 8, and completes the lane change to the lane L2, as indicated by a state ST2. Then, the vehicle 1 travels on the lane L2 and enters the branch road, as indicated by a state ST3.

A case in which the driving state is switched from automated driving to manual driving in the example shown in FIG. 2 will be described next with reference to FIG. 3. The lane change of the vehicle 1 by automated driving may be difficult depending on the congestion status of the lane L2. In this case, the driving state is switched (taken over) from automated driving to manual driving to leave the traveling of the vehicle 1 to the manual operation of the driver.

A state ST11 shows a state in which the train of vehicles X exists on the lane L2, and the space R cannot be ensured. If this state continues, the ECU 20 causes the ECU 28 to notify the driver of a switching request from automated driving to manual driving, as indicated by a state ST12. The notification can be made by the voice guidance of the voice output device 91 or the display guidance of the display device 92.

If the driver accepts switching to manual driving, the ECU 20 stops automated driving and sets manual driving. The driver performs the lane change by the driving operation by himself/herself, as indicated by a state ST13. The acceptance determination may be done based on a specific operation on the input device 93, or may be done based on an operation on the steering wheel 31 or the pedal.

<Notification Timing of Switching Request>

When the switching request from automated driving to manual driving is notified, the driver who has unexpectedly received the notification may be confused in coping with manual driving, or the driver may not notice the notification. In this embodiment, the notification timing is set such that the driver can more reliably cope with manual driving, or the safety is improved even in a case in which the driver does not notice the notification.

More specifically, the timing that comes earliest is set from a plurality of candidates of the notification timing. The plurality of candidates includes a manual support candidate based on a condition necessary for completing a lane change by manual driving and a safety support candidate based on a condition necessary for setting the vehicle 1 in a predetermined standby state by automated driving. The candidates of the notification timing may include a candidate other than the two types of candidates. However, if there are many candidates, the calculation load of each candidate may be large. Hence, in this embodiment, of the two types of candidates, the timing that comes earliest is set as the notification timing.

Figure 4:
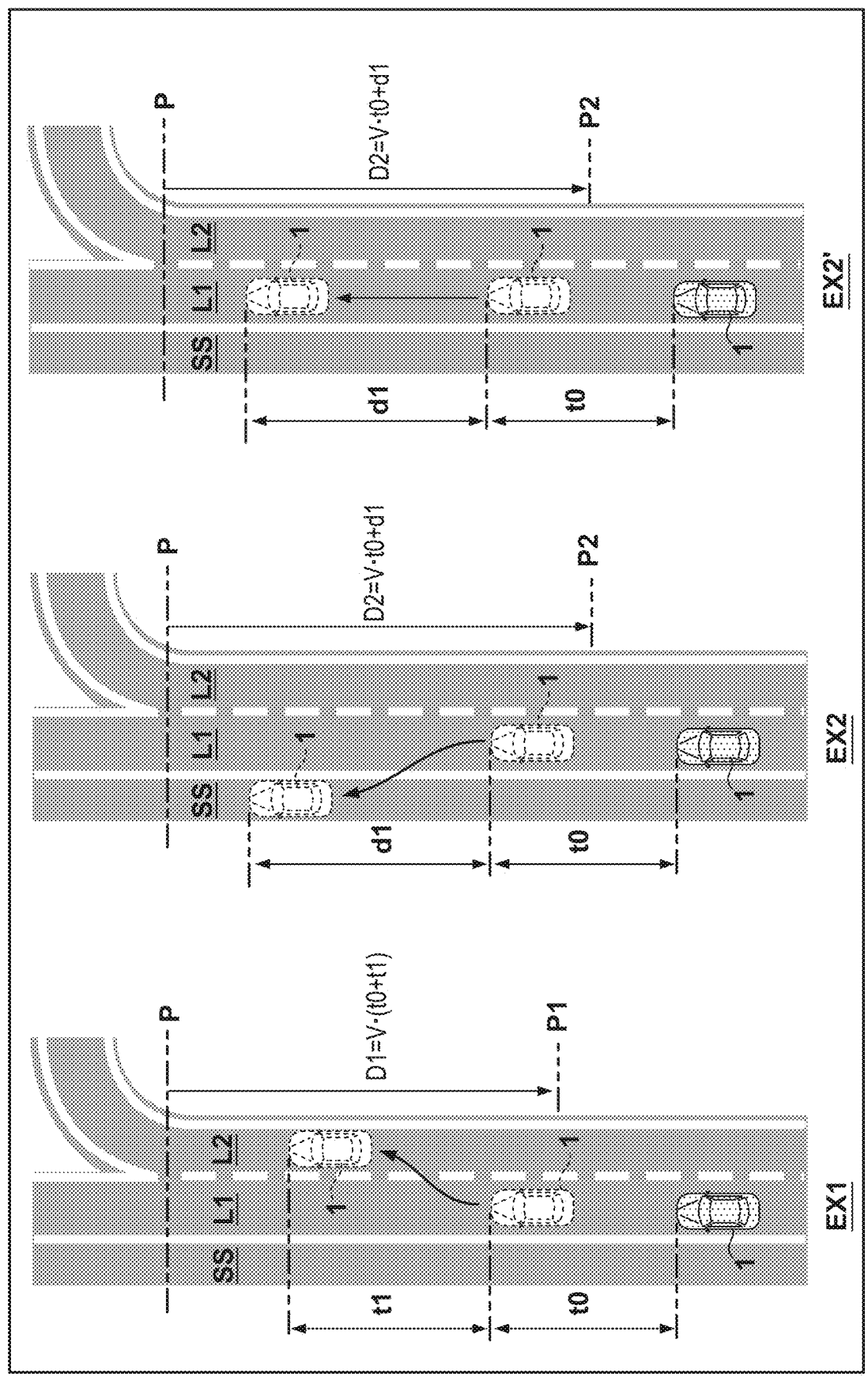
FIG. 4 is an explanatory view showing an example of notification timing candidates.

EX1 of FIG. 4 is an explanatory view showing an example of a manual support candidate calculation method. In this example, a point P1 a distance D1 before the completion point P is defined as the notification timing. The distance D1 is a distance calculated based on the vehicle speed at the time of the manual support candidate calculation and the added time of a defined time t0 and a moving completion time t1.

The defined time t0 is set as a time in which the driver can respond to the switching request notification. The defined time t0 is, for example, several sec (for example, 4 sec). The defined time t0 may be changed depending on the presence/absence of surroundings monitoring obligations of the driver during automated driving. The defined time t0 may be set to several sec in a case in which the surroundings monitoring obligations exist, or may be set to ten-odd sec (for example, 15 sec) in a case in which the surroundings monitoring obligations do not exist.

The moving completion time t1 is set as a time necessary for the driver to start and end the lane change by manual driving. The moving completion time t1 may be a fixed value (for example, about 6 sec) of a value obtained by travel tests, or may be a variable value depending on the current vehicle speed, the distance between lanes, the road surface state (weather), the traffic congestion state, and the like. At least one value concerning the traveling state or peripheral environment may be calculated as a parameter. For example, when the vehicle speed and the moving distance are taken into consideration, the moving completion time t1 may be calculated by t1=reference time (for example, 6 sec)−(coefficient×vehicle speed)+(coefficient×distance between lanes). As another calculation method, a lookup table in which at least one value concerning the traveling state or peripheral environment is associated with the moving completion time t1 may be stored in the storage device in advance, and the moving completion time t1 may be read out and set.

By making the notification at the point P1, it is possible to ensure the time for the driver to change the lane by manual driving and improve the reliability of the lane change.

EX2 of FIG. 4 is an explanatory view showing an example of a safety support candidate calculation method. In this example, a point P2 a distance D2 before the completion point P is defined as the notification timing. The distance D2 is a distance calculated based on a distance calculated from the vehicle speed at the time of safety support candidate calculation and the defined time to, and a standby state shift distance d1.

The defined time t0 is set as a time in which the driver can respond to the switching request notification, as described above. The standby state shift distance d1 is a moving distance (the linear moving distance in the lane traveling direction) to shift the vehicle 1 to the standby state by automated driving. In this embodiment, the standby state is a stop state, and more particularly, stop in the evacuation space SS outside the lane. In a case in which the evacuation space SS is absent, or in a case in which the evacuation space SS exists, but the stop space cannot be ensured because of the existence of an obstacle, the vehicle 1 stops on the traveling lane L1, as indicated by EXT in FIG. 4. These determinations can be performed based on the detection results of the detection units 41 to 43 or traffic information obtained by the communication device 24c. Note that the standby state may be not the stop state but a slow traveling state. In this case, it may be a slow traveling state at a very low speed (for example, 3 km/h or less).

The standby state shift distance d1 may be a fixed value of a value obtained by travel tests, or may be a variable value depending on the current vehicle speed or the road surface state (weather). At least one value concerning the traveling state or peripheral environment may be calculated as a parameter. For example, the standby state shift distance d1 may be a moving distance in a case in which the vehicle 1 decelerates from the current vehicle speed at a predetermined deceleration (for example, 2 m/sec$^2$) and stops. The deceleration may be a fixed value or may be a variable value according to weather information. In a case in which the vehicle 1 moves to the evacuation space SS and stops, the standby state shift distance d1 may be calculated as a total distance obtained when the vehicle 1 decelerates at a predetermined deceleration on the traveling lane L1 and then slowly moves to the evacuation space SS. Like the moving completion time t1, a lookup table may be stored in the storage device in advance, and the standby state shift distance d1 may be read out and set.

By making the notification at the point P2, in a case in which the driver does not notice the notification, the vehicle 1 can automatically stand by before the completion point P, and the safety of the lane change can be improved. In addition, the driver who notices the notification after that can be given the opportunity for the lane change.

As described above, of the points P1 and P2, the timing that comes early is set to the notification timing, thereby ensuring both the lane change by manual driving and the shift to the standby state by automated driving and improving the reliability and safety of the lane change. Note that in the process of calculating the points P1 and P2, time may be used as the reference, or the distance may be used as the reference. The method is not limited to the above-described calculation method.

<Example of Processing of Course Change>

Figure 5:
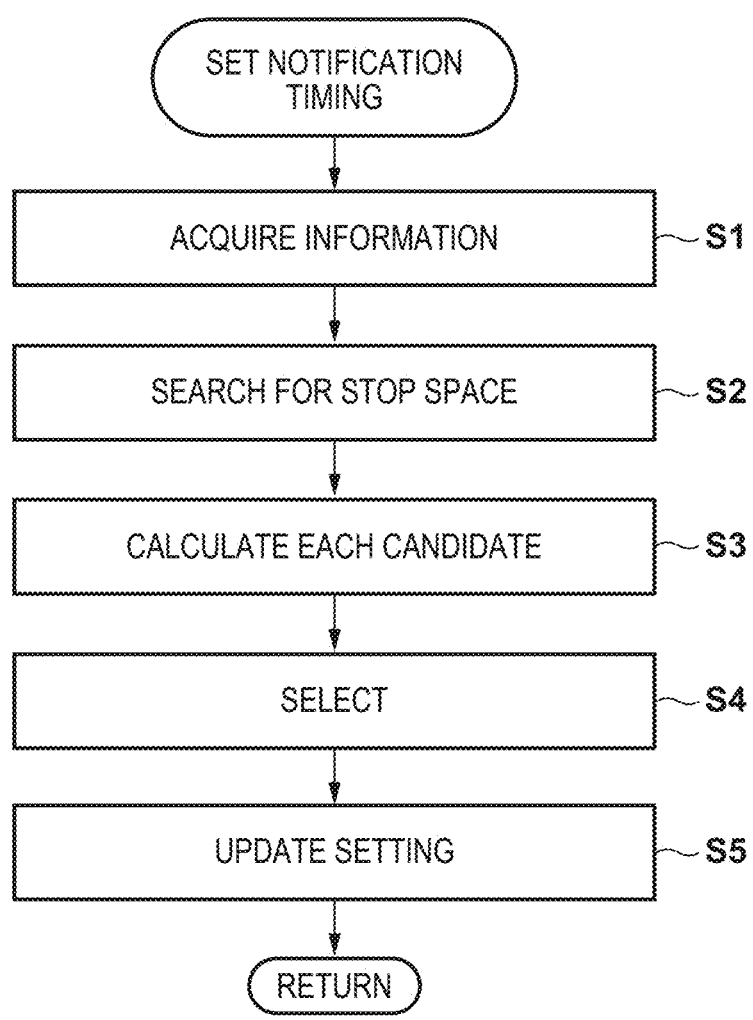
FIG. 5 is a flowchart showing notification timing setting processing.

An example of processing executed by the ECU 20 in association with the operation examples described with reference to FIGS. 2 to 4 will be described. FIG. 5 is a flowchart showing notification timing setting processing. This processing is processing of calculating the candidates of the notification timing described with reference to FIG. 4 and setting one of the candidates as the latest notification timing while sequentially updating the candidates. This processing can be started when the completion point P for the next lane change is decided on the action plan of the vehicle 1, and can be repetitively executed by interrupt processing until the lane change is completed. Alternatively, the processing may be started when the vehicle 1 reaches the starting point SP, and may be repetitively executed by interrupt processing until the lane change is completed.

In step S1, pieces of information necessary for calculating candidates of the notification timing described with reference to FIG. 4 are acquired. For example, pieces of information such as the vehicle speed, the peripheral status, the map, and the congestion status are acquired. In step S2, a stop space necessary for calculating the above-described safety support candidate is searched for. If the stop space cannot be ensured, stop on the traveling lane L1 is selected, as exemplified by EXT in FIG. 4. In addition, standby information is set based on the search result. The standby information is stored in the ECU 20. The standby information includes information necessary for shifting the vehicle 1 to the standby state by automated driving, and includes information of the searched stop space (the evacuation space SS or the traveling lane L1) of the vehicle 1. When shifting to the standby state by automated driving, the standby information is referred to.

In step S3, the candidates of the notification timing are calculated. Here, the calculation processing of the manual support candidate and the safety support candidate described with reference to FIG. 4 is performed. The calculation of the safety support candidate is performed based on the processing result in step S2.

In step S4, of the candidates calculated in step S3, a candidate that comes earliest is selected as the notification timing. In step S5, the setting of the notification timing stored in the ECU 20 is updated to the notification timing selected in step S4. One process thus ends.

Figure 6:
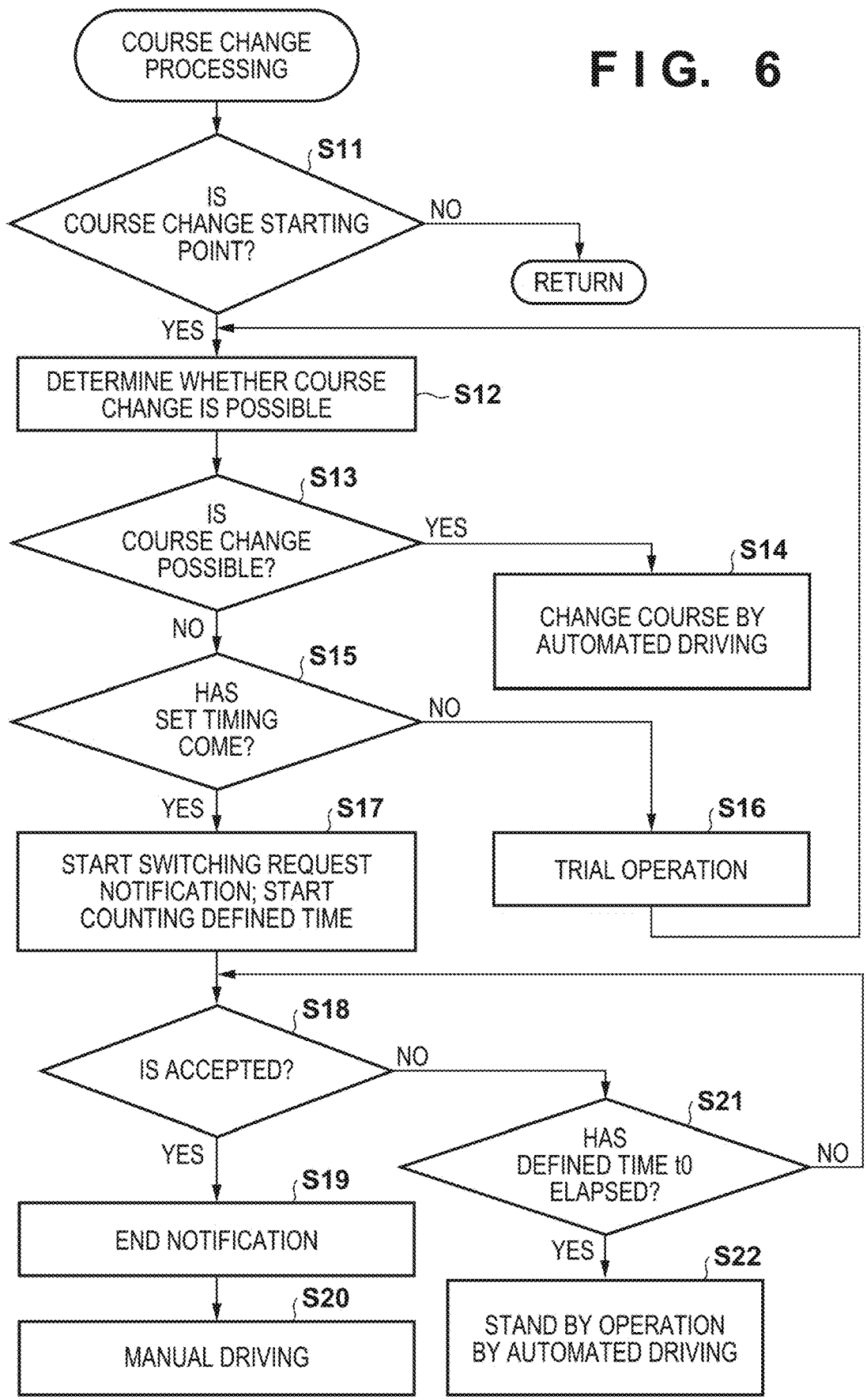
FIG. 6 is a flowchart showing course change processing.

FIG. 6 is a flowchart showing course change processing. This processing is processing concerning the lane change described with reference to FIGS. 2 and 3. The processing contents will be described while referring to FIGS. 2 and 3.

In step S11, it is determined whether the vehicle 1 has reached the starting point SP. If the vehicle 1 has reached the starting point SP, the process advances to step S12. If the vehicle 1 has not reached the starting point SP, the processing ends. In step S12, it is determined whether the course change is possible. Here, it is determined whether the space R described with reference to the state ST1 in FIG. 2 exists, and it is determined whether the vehicle can enter from the lane L1 to the lane L2. In step S13, based on the determination in step S12, if the course change is possible, the process advances to step S14. If the course change is impossible, the process advances to step S15. In step S14, the lane change is performed by automated driving as indicated by the states ST2 and ST3 in FIG. 2.

In step S15, it is determined whether the notification timing set by the processing shown in FIG. 5 has come. If the notification timing has come, the process advances to step S17. If the notification timing has not come, the process advances to step S16. In step S16, the trial operation of the lane change is performed, and the process returns to step S12. In the trail operation, for example, control to accelerate/decelerate the vehicle 1 or maintain the current vehicle speed is performed based on the detection results of the detection units 41 to 43. This is processing for creating or waiting for a state in which the lane change is possible.

Figure 3:
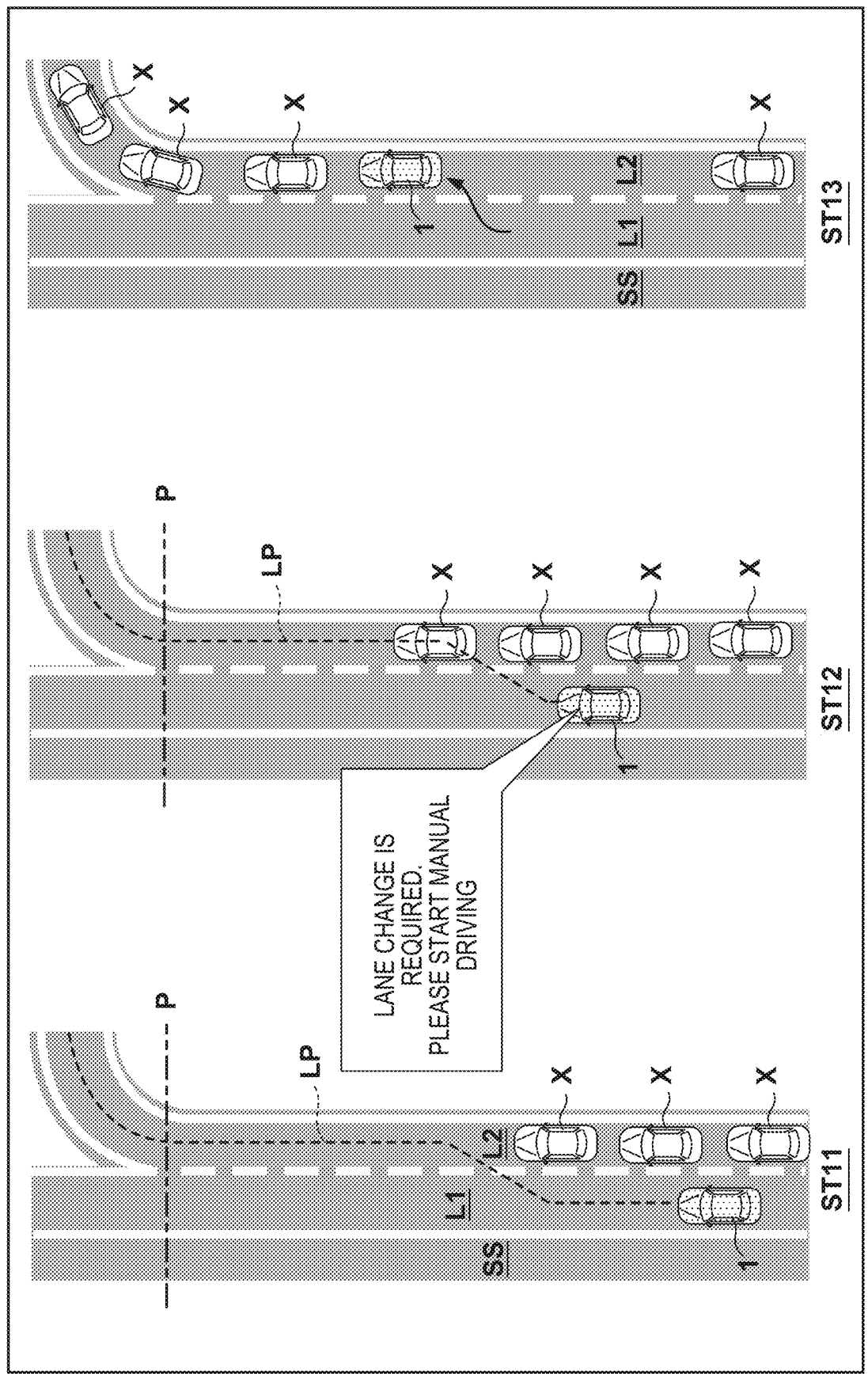
FIG. 3 is an explanatory view of a control example at the time of a course change.

In step S17, the notification of the switching request from automated driving to manual driving is started, as indicated by the state ST12 in FIG. 3. In addition, counting of the defined time t0 is started. In step S18, it is determined whether the driver accepts the switching to manual driving. If the driver accepts, the process advances to step S19. If the driver does not accept, the process advances to step S21. In step S19, the notification of the switching request is ended. In step S20, automated driving is ended, and the vehicle 1 is made to travel by manual driving left to the driving operation of the driver.

In step S21, it is determined whether the defined time t0 has elapsed. If the defined time t0 has not elapsed, the process returns to step S18 to maintain the acceptance waiting state. If the defined time t0 has elapsed, the process advances to step S22.

In step S22, an operation of shifting to the standby state by automated driving is performed. Here, based on the standby information set in step S2 of FIG. 5, the vehicle 1 is shifted to the standby state while blinking the hazard lamp. Based on the standby information stored in the ECU 20, the vehicle 1 stops in the evacuation space SS, as exemplified by EX2 of FIG. 4, or on the traveling lane L1, as exemplified by EXT. The notification of the switching request is continued, and the driver is promoted to do manual driving.

Second Embodiment

In the course change processing shown in FIG. 6 according to the first embodiment, the switching request is notified after reaching to the starting point SP. However, depending on the manner the starting point SP is set, the notification timing may come before the vehicle 1 reaches the starting point SP. In this embodiment, the switching request is notified without using reaching to a starting point SP as a condition. In this embodiment, the processing shown in FIG. 5 is executed before a vehicle 1 reaches the starting point SP.

Figure 7:
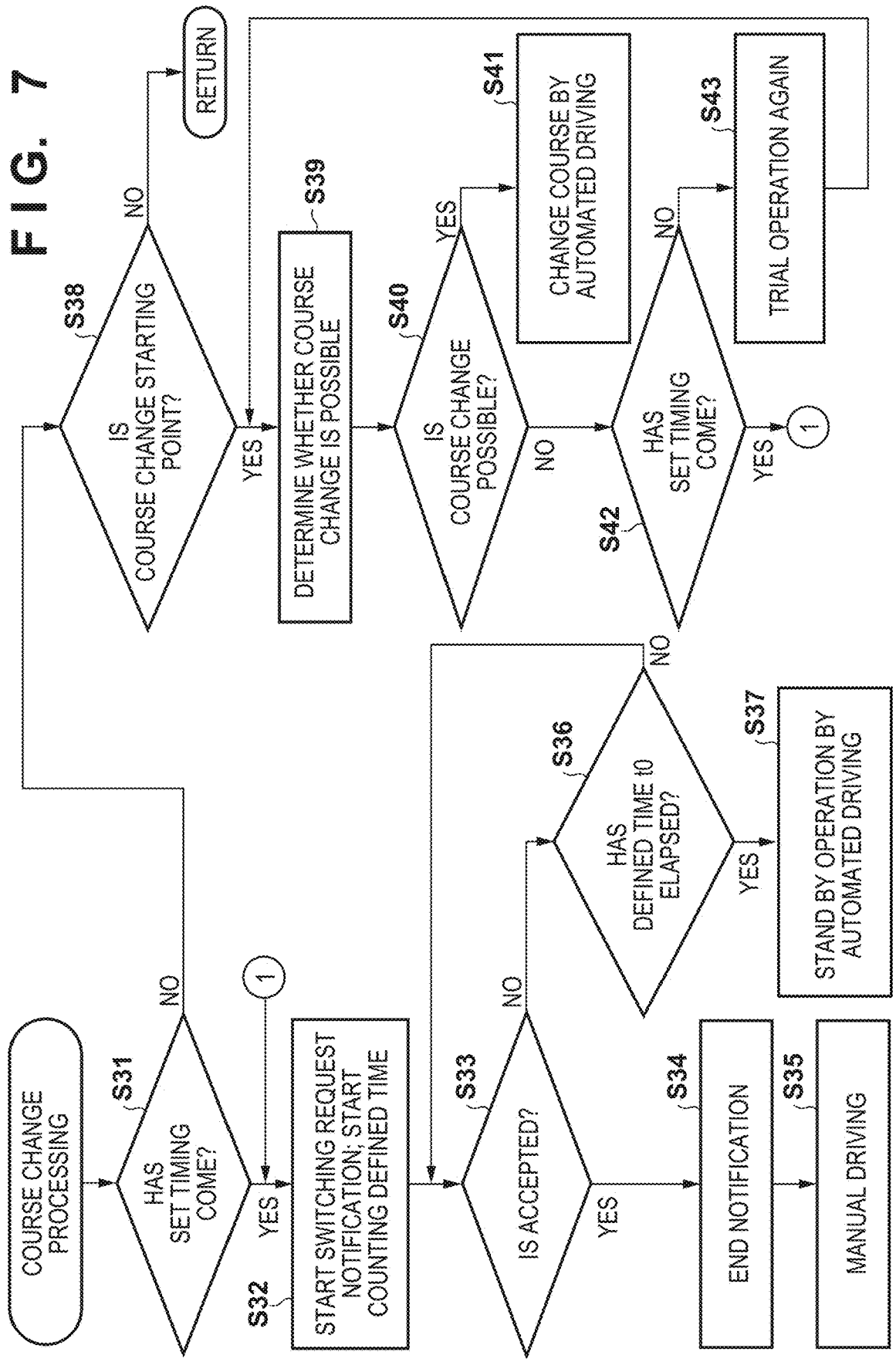
FIG. 7 is a flowchart showing course change processing according to another example.

FIG. 7 is a flowchart of course change processing according to this embodiment. In step S31, it is determined whether the notification timing set by the processing shown in FIG. 5 has come. If the notification timing has come, the process advances to step S32. If the notification timing has not come, the process advances to step S38. Step S32 is the same process as step S17 of FIG. 6. The notification of the switching request from automated driving to manual driving is started, as indicated by a state ST12 in FIG. 3. In addition, counting of a defined time t0 is started.

Step S33 is the same process as step S18 of FIG. 6. It is determined whether the driver accepts the switching to manual driving. If the driver accepts, the process advances to step S34. If the driver does not accept, the process advances to step S36. In step S34, the notification of the switching request is ended. In step S35, automated driving is ended, and the vehicle 1 is made to travel by manual driving left to the driving operation of the driver.

In step S36, it is determined whether the defined time t0 has elapsed. If the defined time t0 has not elapsed, the process returns to step S33 to maintain the acceptance waiting state. If the defined time t0 has elapsed, the process advances to step S37. Step S37 is the same process as step S22, and an operation of shifting to the standby state by automated driving is performed.

In step S38, it is determined whether the vehicle 1 has reached the starting point SP. If the vehicle 1 has reached the starting point SP, the process advances to step S39. If the vehicle 1 has not reached the starting point SP, the processing ends. Step S39 is the same process as step S12 of FIG. 6, and it is determined whether the course change is possible. In step S40, based on the determination in step S39, if the course change is possible, the process advances to step S41. If the course change is impossible, the process advances to step S42. Step S41 is the same process as step S14 of FIG. 6, and the lane change is performed by automated driving as indicated by states ST2 and ST3 in FIG. 2.

In step S42, it is determined whether the notification timing set by the processing shown in FIG. 5 has come. If the notification timing has come, the process advances to step S32. If the notification timing has not come, the process advances to step S43. Step S43 is the same process as step S16 of FIG. 6. The trial operation of the lane change is performed, and the process returns to step S39.

Third Embodiment

In the above-described embodiments, a lane change at a branch point has been exemplified. However, the present invention is also applicable to another lane change. For example, the present invention is applicable to a lane change at a merging point, as indicated by EX11 in FIG. 8. The present invention is applicable to a lane change in a case in which an obstacle Y (for example, a stopped vehicle) exists on a traveling lane L1, as indicated by EX12 in FIG. 8. In the embodiments, a lane change has been exemplified. However, the present invention is also applicable to another course change without a lane change.

Fourth Embodiment

In the above-described embodiments, a case in which a lane change can be performed by automated driving has been described. However, the driving may always be switched to manual driving at the time of a lane change. The notification timing setting method and the like according to the above-described embodiments can be applied to the notification of a switching request in this case.

Summary of Embodiments

1. A vehicle control apparatus according to the embodiment is a vehicle control apparatus capable of switching a driving state to automated driving and manual driving, comprising:

a notification unit (for example, 91, 92) configured to notify a driver of a switching request from the automated driving to the manual driving; and a setting unit (for example, 20) configured to set a notification timing of the notification unit, wherein in a case in which a course change of a vehicle is needed up to a predetermined point during the automated driving, the setting unit sets a timing that comes earliest from a plurality of candidates of the notification timing (for example, S5), and the plurality of candidates includes:

a first candidate (for example, EX1) based on a condition necessary for completing the course change by the manual driving up to the predetermined point, and a second candidate (for example, EX2, EX2') based on a condition necessary for setting the vehicle in a predetermined standby state by the automated driving up to the predetermined point.

According to this embodiment, it is possible to ensure both the course change by manual driving and the shift to the standby state by automated driving and improve the reliability and safety of the course change.

2. In the vehicle control apparatus according to the embodiment, the first candidate and the second candidate are timings based on, as a condition, an elapse of a defined time (for example, t0) common to the first candidate and the second candidate.

According to this embodiment, it is possible to ensure a time in which the driver responds to the notification and accepts manual driving and more properly select switching to the manual driving and the shift to the standby state.

3. In the vehicle control apparatus according to the embodiment, the notification of the notification unit is executed when the course change is impossible after a start of processing of the course change (for example, S12) by the automated driving (for example, S17).

According to this embodiment, in a case in which a course change is attempted first by automated driving, and this is difficult, the notification of switching to manual driving can be made. Examples of the case in which the course change is impossible are a case in which the course change is impossible based on a trouble (for example, quick approach of a vehicle from the rear side) that has occurred after the vehicle starts moving in the lateral direction and a case in which the course change is impossible based on a trouble (for example, a case in which no space can be confirmed because of much traffic at the course change destination) that has occurred before the vehicle starts moving in the lateral direction.

4. In the vehicle control apparatus according to the embodiment, the predetermined standby state is one of a stop state and a slow traveling state of the vehicle.

According to this embodiment, the driver who does not cope with the notification can be maintained in a relatively safe state.

5. In the vehicle control apparatus according to the embodiment, the course change is a lane change.

According to this embodiment, it is possible to improve the reliability and safety of the lane change.

6. In the vehicle control apparatus according to the embodiment the notification of the notification unit is not executed in a case in which the course change by the automated driving is started before the notification timing set by the setting unit comes (for example, S14, S15, S16).

According to this embodiment, it is possible to avoid unnecessarily making the notification.

7. A vehicle control apparatus according to the embodiment is a vehicle control apparatus capable of switching a driving state to automated driving and manual driving, comprising:

a processor (for example, 20); and a storage device (for example, 20) that stores a program to be executed by the processor, wherein by executing the program (for example, FIGS. 5-7) by the processor, the apparatus sets a timing that comes earliest from a plurality of candidates of a notification timing of notifying a driver of a switching request from the automated driving to the manual driving in a case in which a course change of a vehicle is needed up to a predetermined point during the automated driving (for example, S5), and the plurality of candidates includes:

a first candidate (for example, EX1) based on a condition necessary for completing the course change by the manual driving up to the predetermined point, and a second candidate (for example, EX2, EX2') based on a condition necessary for setting the vehicle in a predetermined standby state by the automated driving up to the predetermined point.

According to this embodiment, it is possible to ensure both the course change by manual driving and the shift to the standby state by automated driving and improve the reliability and safety of the course change.

8. A vehicle control apparatus according to the embodiment is a vehicle control apparatus capable of switching a driving state to automated driving and manual driving, comprising:

a notification unit (for example, 91, 92) configured to notify a driver of a switching request from the automated driving to the manual driving; and a setting unit (for example, 20) configured to set a notification timing of the notification unit, wherein in a case in which a course change of a vehicle is needed up to a predetermined point during the automated driving, the setting unit sets the notification timing from a plurality of candidates of the notification timing (for example, S5), the plurality of candidates includes:

a first candidate (for example, EX1) based on a condition necessary for completing the course change by the manual driving up to the predetermined point, and a second candidate (for example, EX2, EX2') based on a condition necessary for setting the vehicle in a predetermined standby state by the automated driving up to the predetermined point, and the setting unit sets the first candidate based on, as a condition, at least that the timing of the first candidate comes earlier than the second candidate, and sets the second candidate based on, as a condition, at least that the timing of the second candidate comes earlier than the first candidate.

According to this embodiment, it is possible to ensure both the course change by manual driving and the shift to the standby state by automated driving and improve the reliability and safety of the course change.

9. A vehicle according to the embodiment comprises:

a detection unit (for example, 41-43) configured to detect a peripheral status of the vehicle;

an operation unit (for example, 31, 7A, 7B) configured to accept a driving operation of a driver;

a control unit (for example, 2) capable of switching a driving state to automated driving in which the vehicle is made to travel along a scheduled route based on a detection result of the detection unit and manual driving in which the vehicle is made to travel based on the driving operation for the operation unit; and a notification unit (for example, 91, 92) configured to notify the driver of a switching request from the automated driving to the manual driving, wherein the control unit calculates a plurality of candidates of a notification timing of the notification unit and sets a timing that comes earliest from the plurality of candidates in a case in which a course change of the vehicle is needed up to a predetermined point during the automated driving (for example, S5), and the plurality of candidates includes:

a first candidate (for example, EX1) based on a condition necessary for completing the course change by the manual driving up to the predetermined point, and a second candidate (for example, EX2, EX2') based on a condition necessary for setting the vehicle in a predetermined standby state by the automated driving up to the predetermined point.

According to this embodiment, it is possible to ensure both the course change by manual driving and the shift to the standby state by automated driving and improve the reliability and safety of the course change.

The present invention is not limited to the above embodiments, and various changes and modifications can be made within the spirit and scope of the present invention. Therefore, to apprise the public of the scope of the present invention, the following claims are made.

The invention claimed is:

1. A vehicle control apparatus capable of switching a driving state to automated driving and manual driving, comprising:

a notification unit configured to notify a driver of a switching request from the automated driving to the manual driving; and a setting unit configured to set a notification timing of the notification unit, wherein in a case in which a course change of a vehicle is needed up to a predetermined point during the automated driving, the setting unit sets a timing that comes earliest from a plurality of candidates of the notification timing, the plurality of candidates includes:

a first candidate based on a condition necessary for completing the course change by the manual driving up to the predetermined point, and a second candidate based on a condition necessary for setting the vehicle in a predetermined standby state by the automated driving up to the predetermined point, and the notification of the notification unit is executed when the course change is impossible after a start of processing of the course change by the automated driving.

2. The vehicle control apparatus according to claim 1, wherein the first candidate and the second candidate are timings based on, as a condition, an elapse of a defined time common to the first candidate and the second candidate.

3. The vehicle control apparatus according to claim 1, wherein the predetermined standby state is a stop state or a slow traveling state of the vehicle.

4. A vehicle control apparatus capable of switching a driving state to automated driving and manual driving, comprising:
- a voice output device configured to notify a driver of a switching request from the automated driving to the manual driving by a voice, and
- a controller including at least one processor and at least one storage device and configured to perform:
- setting a timing that comes earliest from a plurality of candidates of notification timing of the voce output device in a case in which a course change of a vehicle is needed up to a predetermined point during the automated driving; and
- executing the notification of the voice output device when the course change is impossible after a start of processing of the course change by the automated driving,
- wherein the plurality of candidates includes:
- a first candidate based on a condition necessary for completing the course change by the manual driving up to the predetermined point, and
- a second candidate based on a condition necessary for setting the vehicle in a predetermined standby state by the automated driving up to the predetermined point.

5. The vehicle control apparatus according to claim 4, wherein the predetermined standby state is a stop state or a slow traveling state of the vehicle.

6. A control method of a vehicle capable of switching a driving state to automated driving and manual driving, comprising:
- setting a timing that comes earliest from a plurality of candidates of notification timing of notification of a driver of a switching request from the automated driving to the manual driving in a case in which a course change of a vehicle is needed up to a predetermined point during the automated driving, and
- executing the notification when the course change is impossible after a start of processing of the course change by the automated driving,
- wherein the plurality of candidates includes:
- a first candidate based on a condition necessary for completing the course change by the manual driving up to the predetermined point, and
- a second candidate based on a condition necessary for setting the vehicle in a predetermined standby state by the automated driving up to the predetermined point.

7. The method according to claim 6, wherein the predetermined standby state is a stop state or a slow traveling state of the vehicle.

* * * * *